US012293170B1

(12) United States Patent
Van Voorden et al.

(10) Patent No.: US 12,293,170 B1
(45) Date of Patent: May 6, 2025

(54) SECURING AN APPLICATION PROGRAMMING INTERFACE ("API") DURING THE BUILD OF A SOFTWARE DEVELOPMENT KIT ("SDK")

(71) Applicant: Snap Inc., Santa Monica, CA (US)

(72) Inventors: Frederik Van Voorden, Los Angeles, CA (US); Aaron Wangugi, Los Angeles, CA (US); Ankit Sultania, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 124 days.

(21) Appl. No.: 18/315,411

(22) Filed: May 10, 2023

(51) Int. Cl.
*G06F 8/41* (2018.01)
*G06F 9/54* (2006.01)
*G06F 11/36* (2006.01)
*G06F 11/3668* (2025.01)
*H04L 9/32* (2006.01)

(52) U.S. Cl.
CPC ............ *G06F 8/41* (2013.01); *G06F 11/3684* (2013.01); *H04L 9/3247* (2013.01); *G06F 9/547* (2013.01)

(58) Field of Classification Search
None
See application file for complete search history.

(56) References Cited

U.S. PATENT DOCUMENTS 6,684,389 B1 * 1/2004 Tanaka .................... G06F 21/14
717/162
8,868,925 B2 * 10/2014 Wyatt ..................... G06F 21/53
718/1
2014/0215587 A1 * 7/2014 Burch ................... H04W 12/04
726/6
2018/0288033 A1 * 10/2018 Kamal ..................... G06F 21/64
2021/0014062 A1 * 1/2021 Bhattacharjee ....... H04L 63/126
2021/0049289 A1 * 2/2021 Garcia Morchon .... G06F 21/64

OTHER PUBLICATIONS

Crocket, et al., "Alchemy: A Language and Compiler for Homomorphic Encryption Made easy," ACM, 2018, 18pg. (Year: 2018).*
Pewny et al., "Steroids for DOPed Applications: A Compiler for Automated Data-Oriented Programming," IEEE, 2019, 16pg. (Year: 2019).*

* cited by examiner

*Primary Examiner* — Ryan D. Coyer
(74) *Attorney, Agent, or Firm* — Schwegman Lundberg & Woessner, P.A.

(57) ABSTRACT

Described is a technique for securing a private secret key during a software build process for a software development kit (SDK) that includes a code implementation for an application programming interface (API), where the private secret key is for use in signing the payload of an API request for the API. Consistent with examples, a keychain service stores a private secret key. In at least one source code file for a SDK, the source code includes a macro definition, which, upon executing by a compiler, obtains a value for the private secret key. In a programming shell environment, a shell script is executed. Execution of the shell script results in executing a nested script, which queries the keychain service for the private secret key. The shell script then passes the private secret key to a build script of an automated software build tool/system, which injects the private secret key into the source code file at compile time by execution of the macro, resulting in a software product capable of using the private secret key to sign or encrypt the payload of one or more API requests.

20 Claims, 7 Drawing Sheets

SECURING AN APPLICATION PROGRAMMING INTERFACE ("API") DURING THE BUILD OF A SOFTWARE DEVELOPMENT KIT ("SDK")

TECHNICAL FIELD

The present application describes techniques for securing a private secret key during a software build process for code modules of a software development kit (SDK) that includes an implementation for an application programming interface (API), where the private secret key is for use in signing or encrypting the payload of API requests for the API, for example, for purposes of authenticating the API requests.

BACKGROUND

Many enterprises that provide some variety of online service may make some or all of the functionality of the online service available to other enterprises, in many instances via a software development kit ("SDK") that may include one or more libraries implementing an application programming interface ("API"). In this context, a software development kit (SDK) is a collection of tools, libraries, and documentation that is intended to enable software developers or application developers to create software applications for a particular platform or online service. SDKs typically include tools for compiling, testing, and debugging software, as well as libraries and APIs that provide access to specific functionality or services of the enterprise providing the SDK. SDKs are designed to simplify the development process by providing developers with pre-built components and tools that they can use to quickly create software applications without having to write the entire application from scratch. This can save a significant amount of time and effort, as developers can focus on building their applications rather than worrying about low-level details. SDKs are often provided by companies or organizations that want to encourage developers to build applications that run on their platform or use their services.

FIG. 1 illustrates an example of a service being provided by a first enterprise (e.g., Enterprise #1). Here, the service is facilitated by the interaction server 100, which is accessible via a web server 102 and via an API server 104. Developers of the first enterprise (e.g., Enterprise #1) have also used a software development system 106 to develop and build an SDK 108, shown in FIG. 1 to include multiple code modules, each with one or more code implementations for one or more API calls. Accordingly, developers of a second enterprise (e.g., Enterprise #2) have used the software development system 110 to develop and build a software application 112, by combining components of the SDK 108 provided by the first enterprise (#1) with custom source code 114. For example, the custom source code 114 may reference portions of the software code included in the SDK 108, thereby allowing the developers associated with the second enterprise (e.g., Enterprise #2) to quickly develop, build and deploy the software application 112, with functionality made possible via the SDK 108. As shown in FIG. 1, the application 112 has been installed on a user system 116. The application 112 uses one or more API calls from the SDK 108 to direct API requests, including the API payload 118 over a public network 120 to the API server 104 of the first enterprise.

In order to prevent unauthorized access to, and potential abuse of, the service (e.g., as provided by the interaction server 100) via the API server 104, the code modules of the SDK 108 implementing the API calls are generated to include a private secret key. Accordingly, upon invoking an API request, the private secret key is typically used as a means of identifying and authenticating the caller of an API server 104. This key is a unique, secret string of characters that is generated by the API provider (e.g., Enterprise #1) and shared with authorized users or applications, in this instance, through distribution of an SDK 108. When the application 112 executing on the user system 116 makes an API call, the API payload 118 includes the private secret key in the API request as a way of verifying the identity of the caller. Alternatively, the private secret key may be used to digitally sign or encrypt the API payload 118. In either case, the API server 104 of the API provider (e.g., Enterprise #1) checks the API payload 118 (e.g., the key) to ensure that the API request is valid and associated with an authorized user or application. If the private secret key is valid, the API server 104 will allow the requested action to be performed and return the requested data to the calling application 112. The private secret key is an important security mechanism because it helps to ensure that only authorized applications can access the API. Without this key, anyone could potentially access and use the API, which could lead to security vulnerabilities or abuse. Therefore, it is important to secure the private secret key at all times, including during the software development and build process for the SDK.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Described herein are techniques for securing a private secret key during a software development and build process, where the private secret key is for use in authenticating application programming interface (API) requests made with code modules provided as part of a software development kit (SDK). It will be evident, however, to one skilled in the art, that the present invention may be practiced and/or implemented with varying combinations of the many details and features presented herein.

Figure 1:
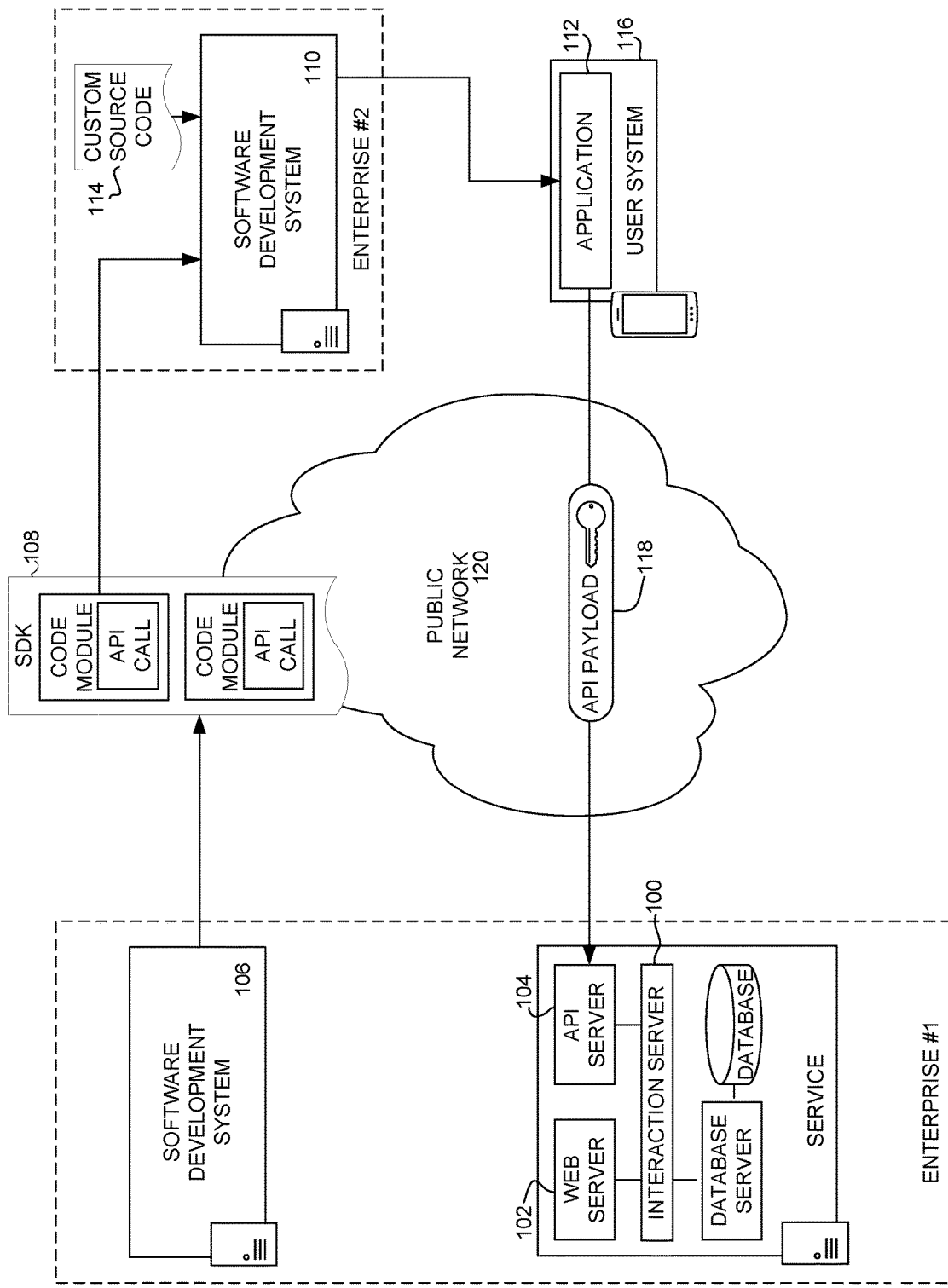
FIG. 1 is a diagrammatic representation of a network-based environment showing a software development system for use in developing and building code modules for a software development kit, having an API that is secured with a private secret key, consistent with various examples.

When providing access to an online service through the implementation of an API, it is critical to ensure that the online service is only accessed by software applications that have been granted the proper authority to access and utilize the online service. This is generally accomplished through the use of a private secret key. For instance, as described in connection with FIG. 1, a software application 112 that has been developed with an SDK will utilize a private secret key to digitally sign or encrypt an API payload. Accordingly, when the API payload 118 is received at an API server 104, the API server 104 can process the API payload 118 to determine whether or not the API payload originated from an authorized software application.

Figure 2:
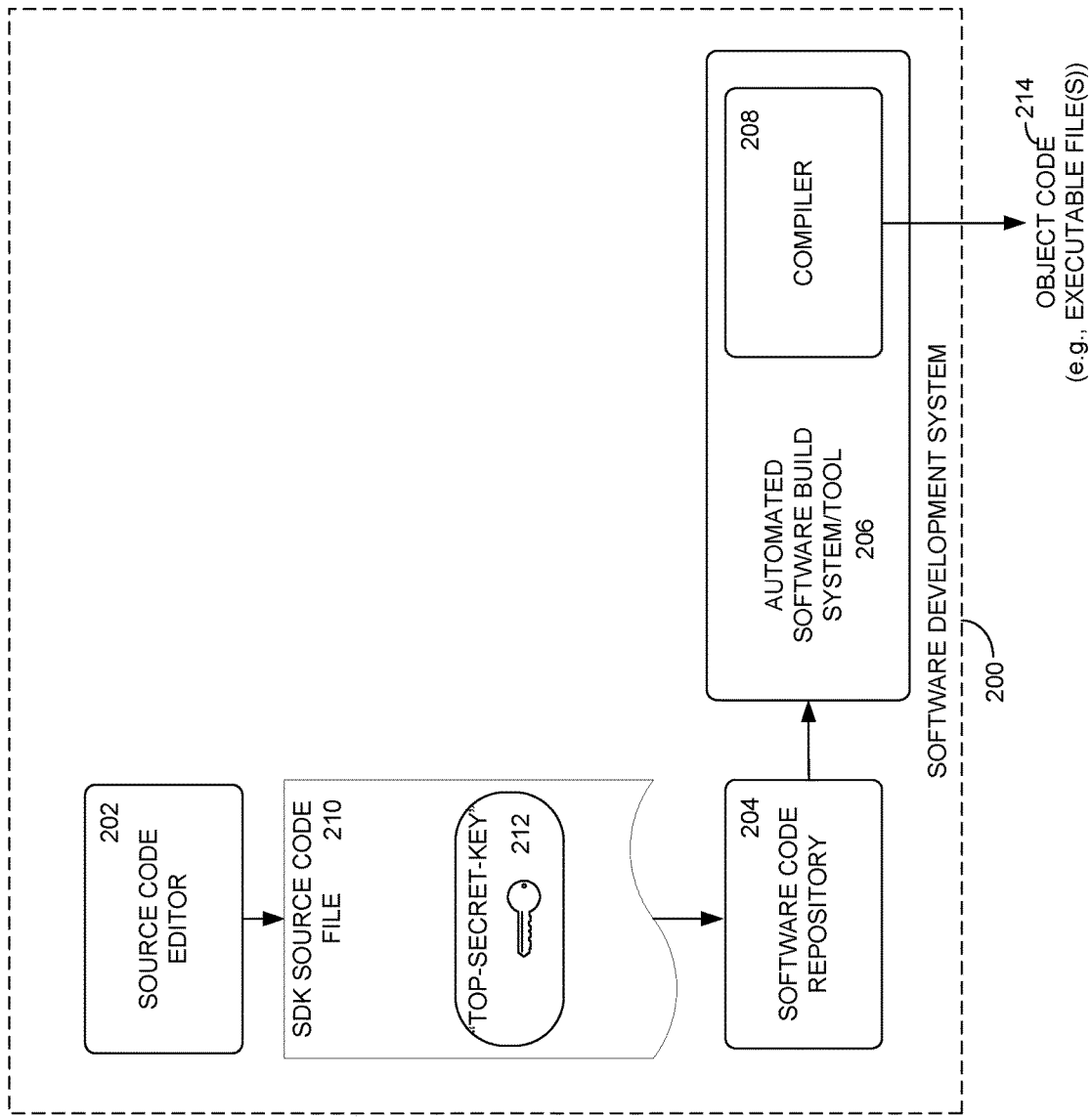
FIG. 2 is a diagrammatic representation of a software development system and conventional technique for building code modules for a software development kit having an API with a private secret key.

FIG. 2 is a diagrammatic representation of a software development system 200 and conventional technique for building software object code 214 for a software development kit having an API with a private secret key. Software development systems generally involve many software development tools that interact with one another and operate together. For example, as shown in FIG. 2, the software development system 200 includes a source code editor 202, a software code repository 204, an automated software build system 206 with an integrated software compiler 208. Generating an executable file for a targeted computing environment (e.g., iOS®, Android®, Windows®, MacOS®, etc.) will typically involve two stages-a development stage and a build stage.

First, during the actual software development stage, software developers will use a source code editor 202 to generate and edit source code files 210. The source code files 210 contain the actual source code-typically in the form of functions, descriptions, definitions, calls, methods and other operational statements-all expressed in one of a variety of programming languages (e.g., C, C++, Objective-C, Java, JavaScript, Python, etc.) The source code files 210 may be stored in a software code repository 204, which may be a cloud-based service accessible via a public network (e.g., the Internet), or as an on-premises service accessible via a private network.

After the source code files have been generated, an automated software build system or tool 206 is used to build the object code. Building the object code, or executable file, may involve many steps. As such, an automated software build system provides a means for reliably and repeatedly performing the many steps that are involved with building a software artifact (e.g., object code). For example, an automated software build system 206 may integrate with a software code repository 204 to retrieve the latest version of source code for a particular software build. The automated software build system 206 may manage the dependencies of a software build, for example, by ensuring that all referenced source code files, libraries, and modules are available at their specified locations (e.g., file directories). Finally, an automated software build system 206 will generally be integrated with a compiler 208. The compiler 208 is responsible for compiling the source code expressed in the source code files to generate machine-readable code, frequently referred to as object code, an object module, or an executable file 214.

As shown in FIG. 2, one approach to implementing a private secret key for authenticating API requests involves injecting the value of the private secret key (e.g., "TOP-SECRET-KEY" 212) directly into the source code 210, and then storing the value of the top secret key, as expressed in the source code of the source code file 210, in a software code repository 204. By way of example, the following expression represents source code for which the value of a private secret key is provided in plain text, NSString*string=@"TOP-SECRET-KEY";
Key*key=[Key from:string];

In this example, the text string "TOP-SECRET-KEY" represents the actual value of the private secret key.

The problem with this approach is that the security and privacy of the secret key are now potentially compromised, as access to the key is directly dependent upon the strengths of the security mechanisms of the software code repository 204. During the development of an SDK that includes an implementation of an API, many software developers may be involved in the development and testing of the source code modules that ultimately result in the executable file or files that may be distributed with the SDK. Consequently, injecting the value of a private secret key directly into source code that is saved in a software code repository 204 may allow any software developer with access to the relevant source code file 210 to have access to the private secret key 212. As such, a software developer with access to the source code files in the software code repository 204 may, unbeknownst to others, distribute the private secret key to a bad actor. Furthermore, the software code repository 204 and the private secret key 212 may be susceptible to hacking and data breaches from any number of people-aside from software developers-specifically when the software code repository 204 is a cloud-based service. Similarly, if for any reason the security mechanism of the software code repository 204 is misconfigured, unauthorized access to the private secret key may result.

As described in greater detail herein, an improved technique for securing a private secret key for use with an API involves storing the value of the private secret key in a keychain service accessible only via a private network—for example, as compared to a cloud-based service accessible via a public network such as the Internet. Access to the value of the private secret key can then be limited, using the access control mechanism (e.g., an access control list or ACL) of the keychain service, to only those individuals who necessarily need access. In accordance with some examples, with the value of the private secret key stored in a keychain service, the source code need only reference the variable of the private secret key, and need not express in plain text the actual value of the private secret key. For instance, in one example where the source code is expressed in the programming language, Objective-C, the source code may include a macro definition, which is executed at compile time to obtain the value of the private secret key from an environment variable of an automated software build system. Advantageously, this technique allows for granting broad access to the source code files via the source code repository-such that any number of developers can access the source code files—while simultaneously limiting access to the private secret via the ACL of the keychain service. Other aspects and advantages of various examples of the invention are presented herein, in connection with the description of the several figures that follow.

Figure 3:
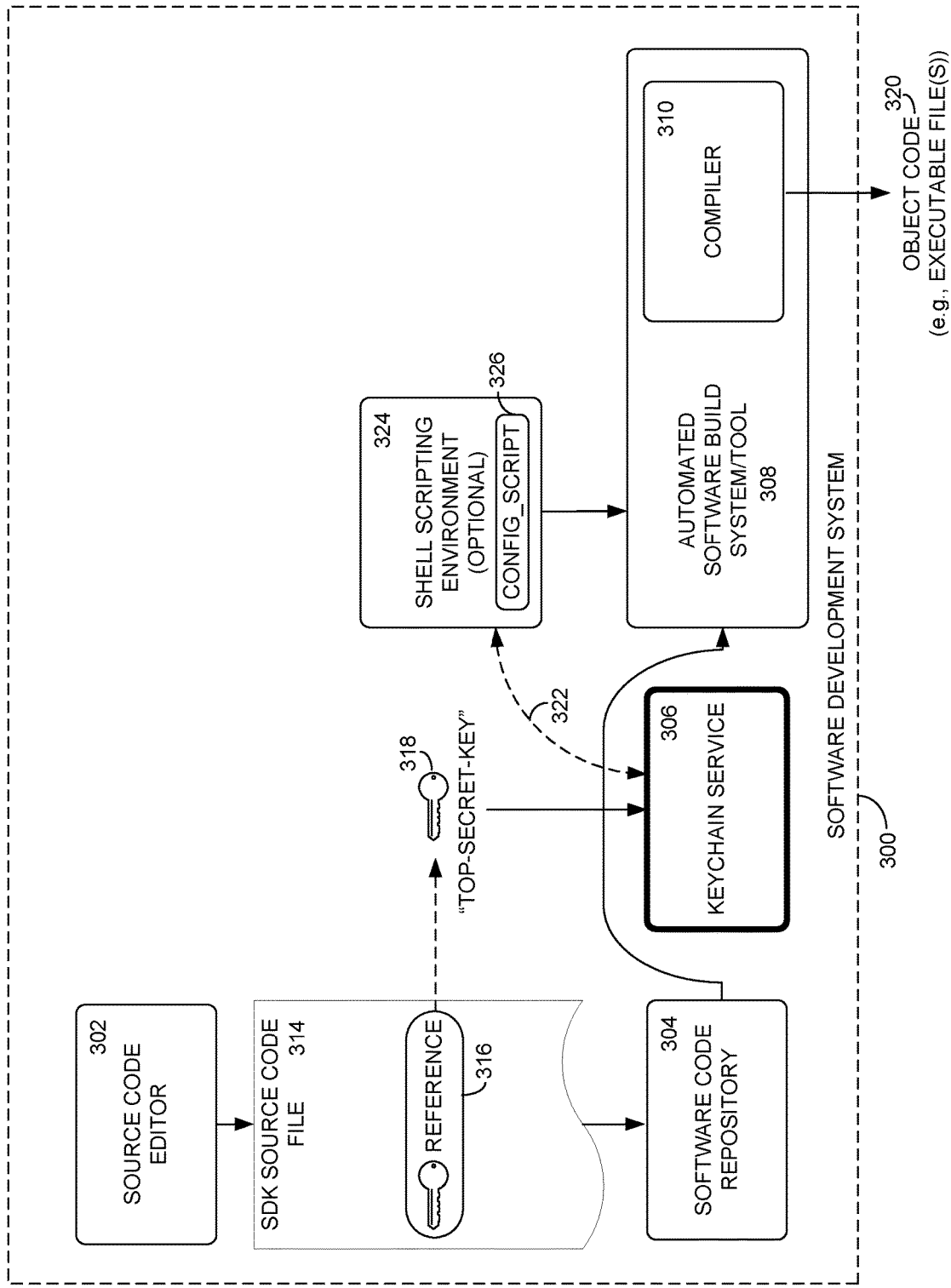
FIG. 3 is a diagrammatic representation of a software development system and improved technique for building code modules for a software development kit having an API with a private secret key, according to some examples.

FIG. 3 is a diagrammatic representation of a software development system 300 and improved technique for building software object code for an SDK having an API with a private secret key, according to some examples. As shown in FIG. 3, the software development system 300 includes a source code editor 302, a software code repository 304, a keychain service 306, and an automated software build system 308 with an integrated compiler 310. In contrast with the software development system 200 illustrated in FIG. 2, the software development system 300 illustrated in FIG. 3 includes a keychain service 306 at which the value of the private secret key 318 is stored, while an SDK source code file 314 includes only a reference to the variable name for the private secret key 318. Accordingly, a software developer will utilize the source code editor 302 to generate the source code file 314 for the SDK, using only the variable name for the private secret key (e.g., reference 316) in the source code file(s) for the SDK. The source code file 314 includes only the reference to the variable name of the private secret key, and not the actual value of the private secret key. In one example, the reference to the variable name may be expressed as a macro definition in Objective-C as follows, ifdef SECRET KEY
Bytes*bytes=[Bytes from: SECRET_KEY];
Key*key=[Key from: bytes]; #endif In this example, the value, "SECRET_KEY", is a reference—for example, a variable name-corresponding with the variable that stores the actual value of the private secret key in the keychain service 306. As such, any software developer, or any other person, with access to the source code file 314 will not have access to the actual value of the private secret key 318, but only the name of the variable for the key.

Referring again to FIG. 3, a software developer with access to the source code files stored in the software code repository 304 will utilize the automated software build system or tool 308 to perform a software build process, during which the source code expressed in the source code files is compiled, by the integrated compiler 310, into object code 320. Accordingly, the value of the private secret key 318 will be injected into the object code 320 at compile time, for example, as the source code of the source code files are compiled by the compiler 310. Further details of the operations of the various components of the software development system 300 during a software build process are described in greater detail below, in connection with the description of FIGS. 4 and 5.

However, it should be noted that in some instances, access to the keychain service 306 may be limited to or restricted by technical aspects of a client library associated with the keychain service 306 and/or limitations and restrictions of the automated software build system 308. For example, in some instances, the automated software build tool 308 may not provide for the installation and execution of a client library that provides the software mechanism for querying the keychain service 306 to access the value of the private secret key. It may be the case that the client library for the keychain service 306 is incompatible with the automated software build system 308. Alternatively, restrictions of the build system environment 308 may prevent installation of the client library for the keychain service 306. Accordingly, consistent with some examples and as illustrated (as optional) in FIG. 3, a script (e.g., "CONFIG_SCRIPT" 326) may be executed in a separate shell scripting environment 324, which may be a Python environment or some other shell scripting environment, where the script executes a command associated with the client library for the keychain service 306 in order to query the keychain service for the private secret key.

Accordingly, as shown by the line 322, when the script 326 is executed in the shell scripting environment 324, the script 326 will cause a request (e.g., a query) to be communicated to the keychain service 306. The request will include at least a reference (e.g., variable name) to the private secret key and an end-user identifier (e.g., a username) of the person who has invoked the request by executing the script 326. The keychain service 306 will process the request, and if the end-user is authorized to access the value of the private secret key, the keychain service 306 will respond by providing the value of the private secret key to the requesting script 326. The value of the private secret key will then be passed to the automated software build system 30 when the script 326 invokes a second script that is executed by the automated software build system 308. Finally, the build system 308, which in this instance is capable of passing arbitrary flags to the compiler 310, will pass the value of the private secret key via a macro defined in a source code file during compile time. For example, at compile time, a macro defined in source code is executed to obtain the value of the private secret key.

Consistent with some examples, the automated software build system 310 may be a version of Buck-a build system written in the Java programming language, which supports building software in many different programming languages. The compiler may be a version of Clang. However, those skilled in the art will readily appreciate that many other build systems and compilers may be utilized in a manner consistent with the inventive subject matter described herein. In one example, the shell script and the build script are executed in separate scripting environments, on the same server computer. However, in other examples, the shells script may pass the key to a build script executing on a separate server computer-different from the server computer hosting the shell scripting environment.

Figure 4:
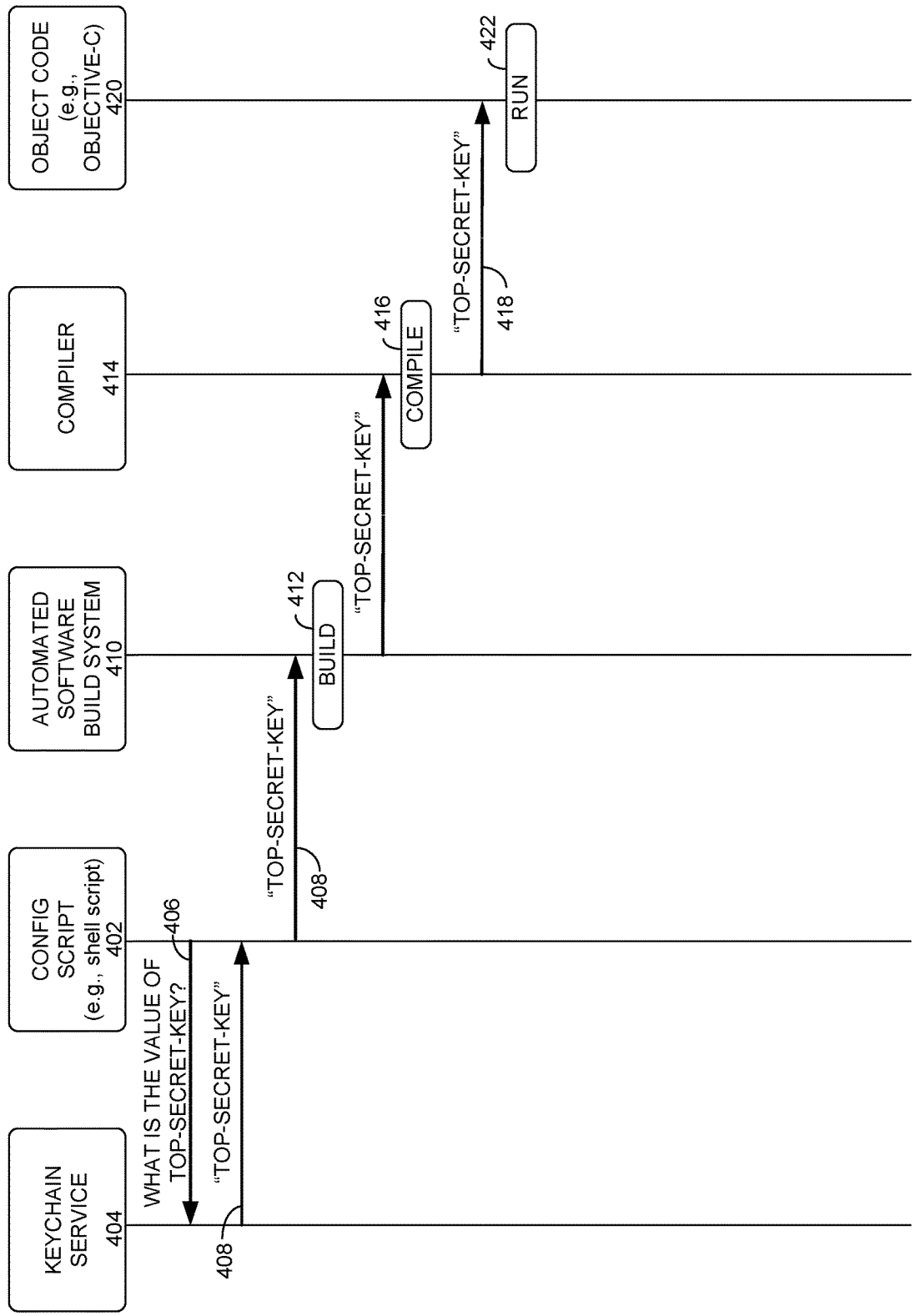
FIG. 4 is a data flow diagram illustrating an example of the processing operations performed by the various components of a software development system, during a software build, consistent with various examples.

FIG. 4 is a data flow diagram illustrating an example of the processing operations performed by the various components of a software development system, during a software build, consistent with various examples. As illustrated in FIG. 4, a software build process will typically begin when a software developer logs into a server-based system and executes a first script in a scripting environment. The scripting environment may be a shell scripting environment, and in some instances, may be a Python scripting environment, such at PyBuilder. In FIG. 4, this first script is referred to as the "CONFIG_SCRIPT" 402. The first script is configured with a command or reference to a client library for the keychain service 404. Accordingly, when the first script is executed, the first script will result in a query for the value of the private secret key being communicated from the first server computer, executing the script, to a sever computer executing the keychain service 404. In FIG. 4, this request is represented by the line with reference number 406 and the label, "What is the value of the top-secret-key?" The request will include at least a reference to the variable for which the value is being sought, and an identifier of the end-user (e.g., software developer) who has invoked the request by executing the first script.

The keychain service 404, upon receiving the request, will process the request to make a determination as to whether the end-user, associated with the end-user identifier received with the request, has authorization to access the private secret key. For example, the keychain service 404 may utilize an access control list (ACL) that designates the specific developers who are authorized to access and view the private secret key. If authorized, the keychain service 404 will respond to the request 406 by communicating the value of the private secret key back to the server computer executing the first script, as shown in FIG. 4 by the line with reference number 408, where the value of the private secret key is represented as "TOP-SECRET-KEY." However, if the end-user is not authorized to access and view the private secret key, the keychain service will respond to the request with a message indicating the end-user is not authorized to access the private secret key.

After the private secret key is communicated back to the server computer executing the "CONFIG_SCRIPT" 402, the script will invoke a build script associated with the automated software build system 410, while passing the value of the private secret key to the build system 410, as shown by the line with reference number 408. The build script will perform various operations in preparation for compiling the source code, as indicated by the operation with reference number 412 (e.g., "BUILD"). For instance, the build script may check various dependencies to ensure that the referenced source code files are available in the specified directories, and so forth. The build script will then invoke the compiler 414 to compile the source code files, as indicated by the operation with reference number 416. During the compilation of the source code, a source code file including a macro definition referencing the variable for the private secret key, is processed or compiled, causing the value of the private secret key to be obtained from a flag passed from the build system 410 to the compiler 414. As a result, the compiler 414 is able to inject the value of the private secret key into the resulting object code 420, which, as shown in FIG. 4, may be in Objective-C. This is shown in FIG. 4 by the line with reference number 418. Accordingly, when the resulting object code is executed—for example, as shown by the operation 422 (e.g., "RUN"), the private secret key can be used to digitally sign an API payload communicated to an API server so that the API server may authenticate the API request. Of course, in most situations, the resulting object code may be distributed via an SDK, such that the object code 420 may be combined with custom source code by software developers who build custom software applications.

Consistent with some examples, the software build process may be undertaken for different purposes. Specifically, it may be the case that some software developers invoke the software build process for purposes of building and testing the object code (e.g., a test build), whereas, in other instances, some software developers may perform the software build process to generate the object code for release as an official version of an SDK (e.g., a production build). Accordingly, in some instances, the first script (e.g., CON-FIG_SCRIPT) may be configured with logic to determine whether a specific build is a test build or a production build. This may be achieved, for example, by assessing and determining whether a specific build process is occurring locally (e.g., on a local server and network) or remotely (e.g., on a remote server). For instance, the logic may obtain and verify an environment variable, associated with the server on which the script is executing, that indicates the specific server environment within which the software build is occurring. Accordingly, when it is determined that the software build is a test build (e.g., local), the script 402 may request a stub version of the private secret key. Here, a stub version of the private secret key is simply a special version or value of the key-a placeholder for the actual key used for testing purposes. By providing a stub value of the private secret key during testing, the security of the actual value of the private secret key can be withheld from software developers whose primary role is testing software.

Figure 5:
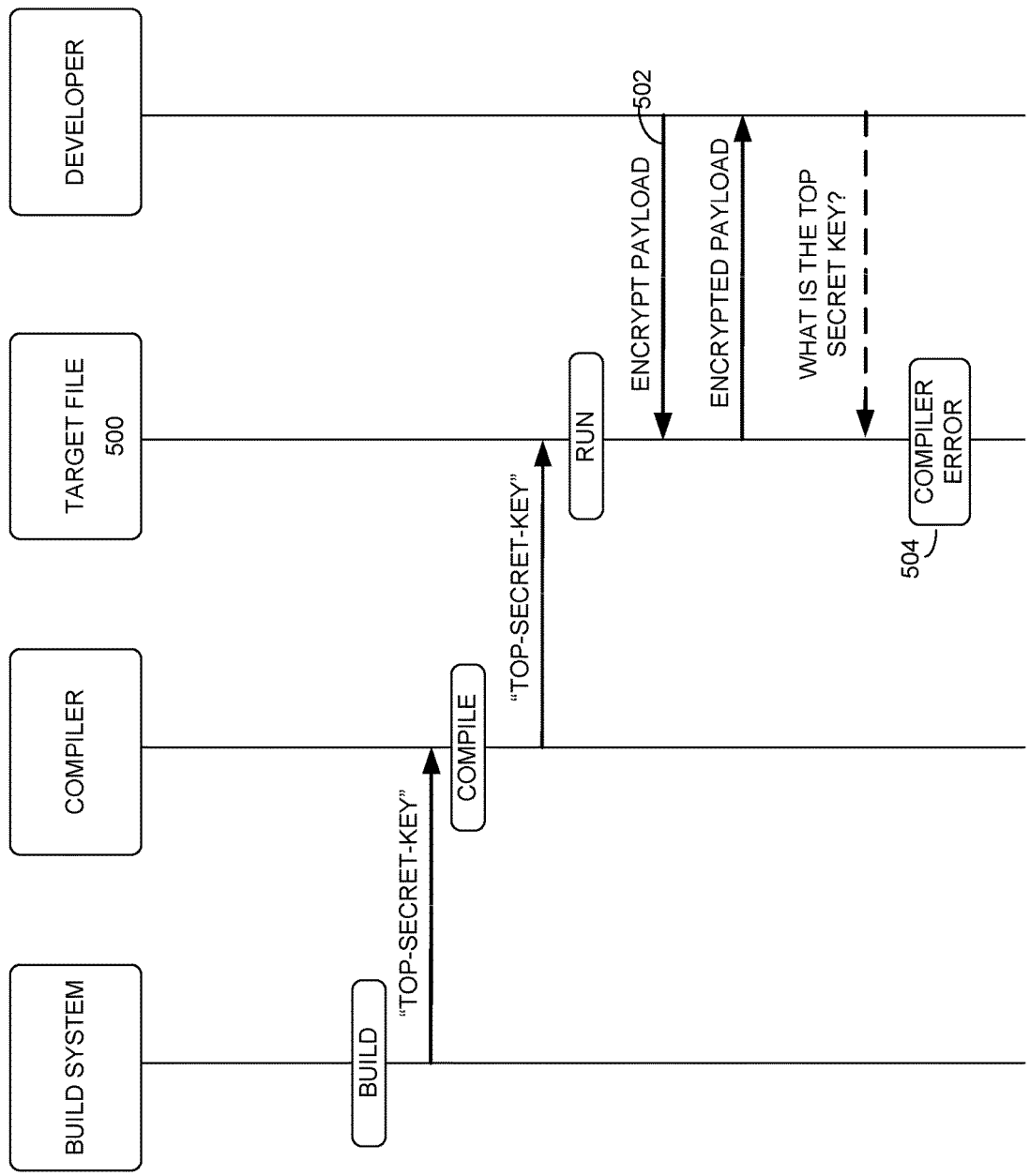
FIG. 5 is a data flow diagram illustrating an example of some additional processing operations performed by various components of a software development system, during a software build, consistent with various examples.

FIG. 5 is a data flow diagram illustrating an example of some additional processing operations performed by various components of a software development system, during a software build, consistent with various examples. Consistent with some examples, in order to add a layer of security in protecting the value of the private secret key, the passing of the value of the private secret key to the source code files, during compilation, is limited to a single source code file for a target build, to ensure that a software developer is only able to use the private secret key with the object code provided with the SDK as intended. Stated differently, the system is designed such that the value of the private secret key can only be passed to a single target file 500. Accordingly, any software developer making use of the specific target source code file 500 has the ability to request, via an API call, an encrypted payload. The target file (which has access to value of the private secret key), has the ability to encrypt the payload as shown by the line with reference 502. However, a software developer trying to make direct use of the private secret key elsewhere in an application will encounter a compiler error when attempting to compile the application, as shown with reference number 504.

Machine Architecture

Figure 6:
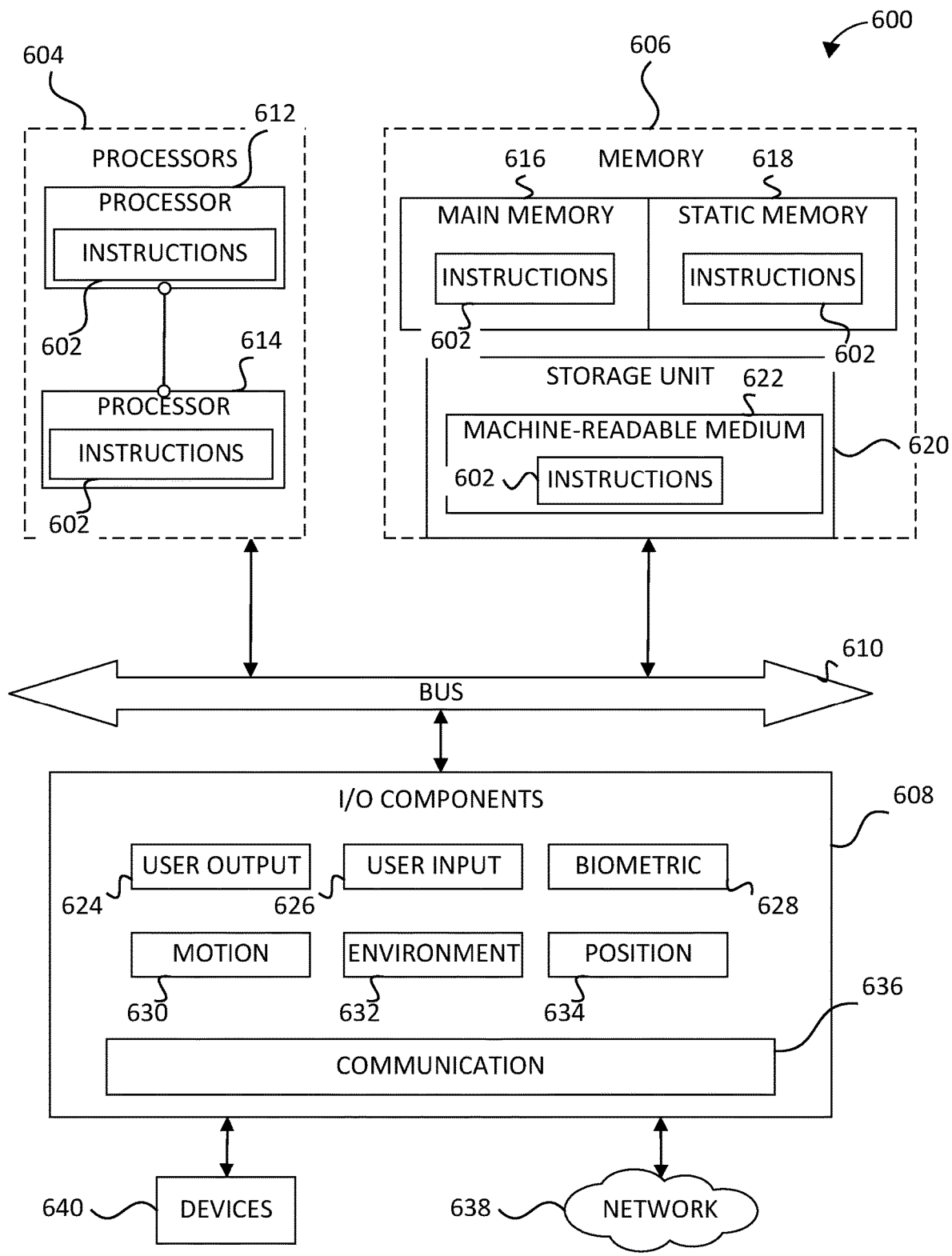
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of a machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system 116 or any one of multiple server devices forming part of the server executing the service associated with interaction server 100. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. The motion components 630 include acceleration sensor components (e.g., accelerometer), gravitation sensor components, rotation sensor components (e.g., gyroscope).

The environmental components 632 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
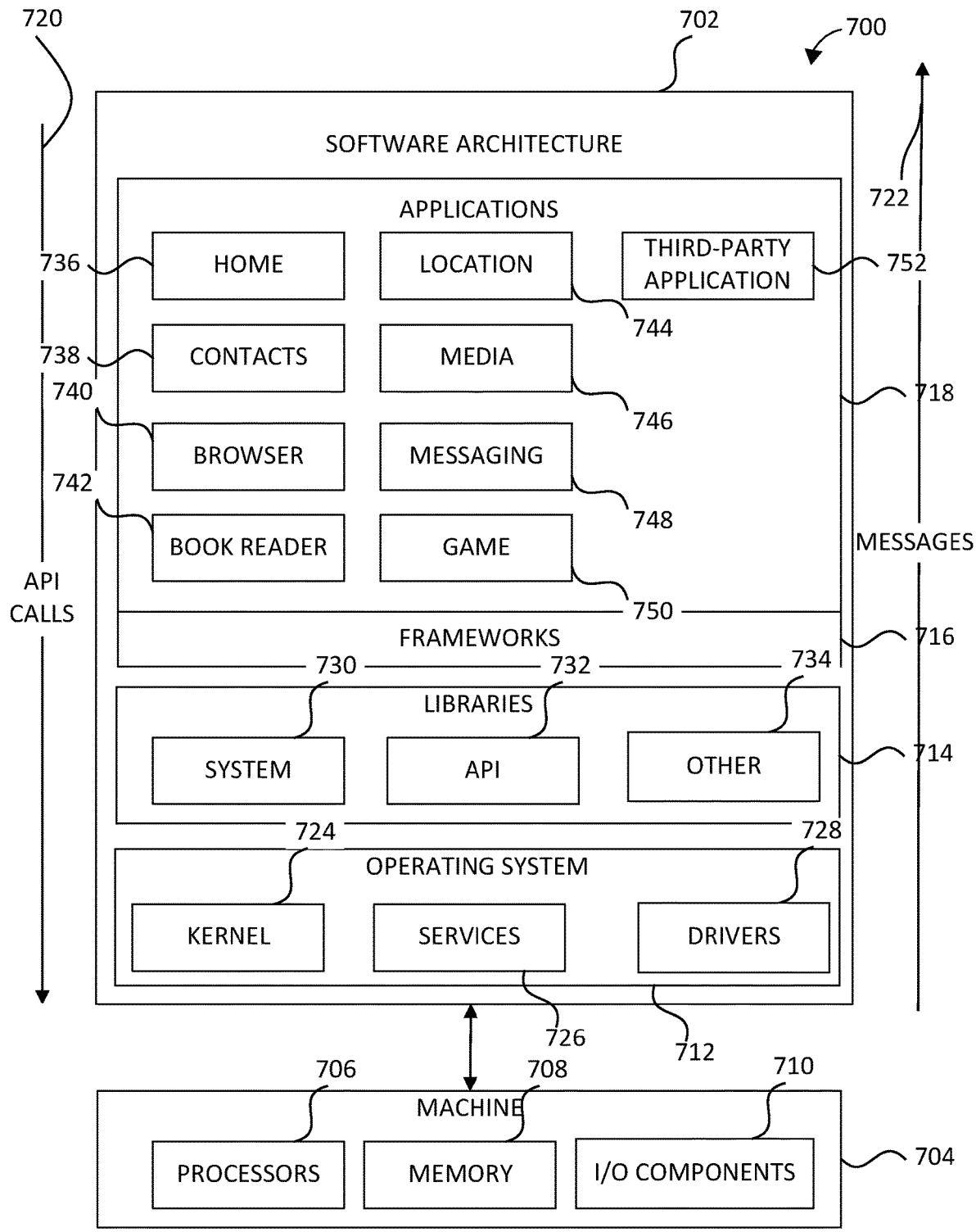
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

EXAMPLES

Example 1 is a system to secure a private secret key during a software build, the system comprising: at least one processor; a memory storage device storing instructions thereon, which, when executed by the processor, cause the system to perform operations comprising: executing a first script at a first server computer, the first script configured to perform operations comprising: communicating a request for a value of a private secret key over a private network from the first server computer to a keychain service executing on a second server computer, the request including a reference to a variable storing the value of the private secret key and an end-user identifier; responsive to communicating the request, receiving from the keychain service the value for the private secret key; and invoking a second script for execution by an automated software build tool at the first server computer while passing from the first script to the second script the value for the private secret key, wherein the second script is configured to build an executable file for distribution with a software development kit, by: invoking a software compiler to compile source code included in one or more source code files into the executable file, wherein at least one source code file contains a macro, which, upon executing at compile time, obtains the value of the private secret key from the automated software build tool for use by the executable file.

In Example 2, the subject matter of Example 1 includes, wherein the keychain service executing on the second server computer, upon receiving the request, utilizes an access control list to determine an end-user, who is associated with the end-user identifier received with the request, is authorized to access the value of the private secret key.

In Example 3, the subject matter of Examples 1-2 includes, wherein the end-user identifier included with the request that is communicated to the keychain service is the end-user identifier associated with an end-user who invoked the execution of the first script.

In Example 4, the subject matter of Examples 1-3 includes, wherein the first script is further configured to: determine that the software build is for a test build based on a server environment variable of a server computer on which the first script was executed; and responsive to determining that the software build is for a test build, communicate a request for a stub value of the private secret key.

In Example 5, the subject matter of Examples 1~4 includes, wherein the first script is further configured to: determine that the software build is for a production build based on a server environment variable of a server computer on which the first script was executed; and responsive to determining that the software build is for a test build, communicate the request for the value of the private secret key.

In Example 6, the subject matter of Examples 1-5 includes, wherein the private secret key is used by a code module included in the executable file to digitally sign a payload for an application programming interface (API) request directed to an API server.

In Example 7, the subject matter of Examples 1-6 includes, wherein communicating a request for the value of a private secret key over a private network from the first server computer to a keychain service executing on a second server computer is accomplished by the first script executing a command to execute a Python client script for the keychain service, wherein the first script is a shell script.

In Example 8, the subject matter of Examples 1-7 includes, wherein the second script is a Python script and the automated software build tool is a version of the Buck automated software build tool.

In Example 9, the subject matter of Examples 1-8 includes, wherein the source code files includes source code expressed in the Objective-C programming language, and the software compiler is a version of Clang.

Example 10 is a computer-implemented method to secure a private secret key during a software build, the method comprising: executing a first script at a first server computer, the first script configured to perform operations comprising: communicating a request for a value of a private secret key over a private network from the first server computer to a keychain service executing on a second server computer, the request including a reference to a variable storing the value of the private secret key and an end-user identifier; responsive to communicating the request, receiving from the keychain service the value for the private secret key; and invoking a second script for execution by an automated software build tool at the first server computer while passing from the first script to the second script the value for the private secret key, wherein the second script is configured to build an executable file for distribution with a software development kit, by: invoking a software compiler to compile source code included in one or more source code files into the executable file, wherein at least one source code file contains a macro, which, upon executing at compile time, obtains the value of the private secret key from the automated software build tool for use by the executable file.

In Example 11, the subject matter of Example 10 includes, wherein the keychain service executing on the second server computer, upon receiving the request, utilizes an access control list to determine an end-user, who is associated with the end-user identifier received with the request, is authorized to access the value of the private secret key.

In Example 12, the subject matter of Examples 10-11 includes, wherein the end-user identifier included with the request that is communicated to the keychain service is the end-user identifier associated with an end-user who invoked the execution of the first script.

In Example 13, the subject matter of Examples 10-12 includes, wherein the first script is further configured to: determine that the software build is for a test build based on a server environment variable of a server computer on which the first script was executed; and responsive to determining that the software build is for a test build, communicate a request for a stub value of the private secret key.

In Example 14, the subject matter of Examples 10-13 includes, wherein the first script is further configured to: determine that the software build is for a production build based on a server environment variable of a server computer on which the first script was executed; and responsive to determining that the software build is for a test build, communicate the request for the value of the private secret key.

In Example 15, the subject matter of Examples 10-14 includes, wherein the private secret key is used by a code module included in the executable file to digitally sign a payload for an application programming interface (API) request directed to an API server.

In Example 16, the subject matter of Examples 10-15 includes, wherein communicating a request for the value of a private secret key over a private network from the first server computer to a keychain service executing on a second server computer is accomplished by the first script executing a command to execute a Python client script for the keychain service, wherein the first script is a shell script.

In Example 17, the subject matter of Examples 10-16 includes, wherein the second script is a Python script and the automated software build tool is a version of the Buck automated software build tool.

In Example 18, the subject matter of Examples 10-17 includes, wherein the source code files includes source code expressed in the Objective-C programming language, and the software compiler is a version of Clang.

Example 19 is a system to secure a private secret key during a software build, the system comprising: means for executing a first script at a first server computer, the first script configured to perform operations comprising: communicating a request for a value of a private secret key over a private network from the first server computer to a keychain service executing on a second server computer, the request including a reference to a variable storing the value of the private secret key and an end-user identifier; responsive to communicating the request, receiving from the keychain service the value for the private secret key; and invoking a second script for execution by an automated software build tool at the first server computer while passing from the first script to the second script the value for the private secret key, wherein the second script is configured to build an executable file for distribution with a software development kit, by: invoking a software compiler to compile source code included in one or more source code files into the executable file, wherein at least one source code file contains a macro, which, upon executing at compile time, obtains the value of the private secret key from the automated software build tool for use by the executable file.

In Example 20, the subject matter of Example 19 includes, wherein the keychain service executing on the second server computer, upon receiving the request, utilizes an access control list to determine an end-user, who is associated with the end-user identifier received with the request, is authorized to access the value of the private secret key.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system to secure a private secret key during a software build, the system comprising:
   at least one processor;
   a memory storage device storing instructions thereon, which, when executed by the processor, cause the system to perform operations comprising:
   executing a first script at a first server computer, the first script configured to perform operations comprising:
      communicating a request for a value of a private secret key over a private network from the first server computer to a keychain service executing on a second server computer, the request including a reference to a variable storing the value of the private secret key and an end-user identifier;
      responsive to communicating the request, receiving from the keychain service the value for the private secret key; and
      invoking a second script for execution by an automated software build tool at the first server computer while passing from the first script to the second script the value for the private secret key, wherein the second script is configured to build an executable file for distribution with a software development kit, by:

invoking a software compiler to compile source code included in one or more source code files into the executable file, wherein at least one source code file contains a macro, which, upon executing at compile time, obtains the value of the private secret key from the automated software build tool for use by the executable file.

2. The system of claim 1, wherein the keychain service executing on the second server computer, upon receiving the request, utilizes an access control list to determine an end-user, who is associated with the end-user identifier received with the request, is authorized to access the value of the private secret key.

3. The system of claim 1, wherein the end-user identifier included with the request that is communicated to the keychain service is the end-user identifier associated with an end-user who invoked the execution of the first script.

4. The system of claim 1, wherein the first script is further configured to:
   determine that the software build is for a test build based on a server environment variable of a server computer on which the first script was executed; and
   responsive to determining that the software build is for a test build, communicate a request for a stub value of the private secret key.

5. The system of claim 1, wherein the first script is further configured to:
   determine that the software build is for a production build based on a server environment variable of a server computer on which the first script was executed; and
   responsive to determining that the software build is for a test build, communicate the request for the value of the private secret key.

6. The system of claim 1, wherein the private secret key is used by a code module included in the executable file to digitally sign a payload for an application programming interface (API) request directed to an API server.

7. The system of claim 1, wherein communicating a request for the value of a private secret key over a private network from the first server computer to a keychain service executing on a second server computer is accomplished by the first script executing a command to execute a Python client script for the keychain service, wherein the first script is a shell script.

8. The system of claim 1, wherein the second script is a Python script and the automated software build tool is a version of the Buck automated software build tool.

9. The system of claim 1, wherein the source code files includes source code expressed in the Objective-C programming language, and the software compiler is a version of Clang.

10. A computer-implemented method to secure a private secret key during a software build, the method comprising:
   executing a first script at a first server computer, the first script configured to perform operations comprising:
      communicating a request for a value of a private secret key over a private network from the first server computer to a keychain service executing on a second server computer, the request including a reference to a variable storing the value of the private secret key and an end-user identifier;
      responsive to communicating the request, receiving from the keychain service the value for the private secret key; and
      invoking a second script for execution by an automated software build tool at the first server computer while passing from the first script to the second script the value for the private secret key, wherein the second script is configured to build an executable file for distribution with a software development kit, by:
         invoking a software compiler to compile source code included in one or more source code files into the executable file, wherein at least one source code file contains a macro, which, upon executing at compile time, obtains the value of the private secret key from the automated software build tool for use by the executable file.

11. The computer-implemented method of claim 10, wherein the keychain service executing on the second server computer, upon receiving the request, utilizes an access control list to determine an end-user, who is associated with the end-user identifier received with the request, is authorized to access the value of the private secret key.

12. The computer-implemented method of claim 10, wherein the end-user identifier included with the request that is communicated to the keychain service is the end-user identifier associated with an end-user who invoked the execution of the first script.

13. The computer-implemented method of claim 10, wherein the first script is further configured to:
   determine that the software build is for a test build based on a server environment variable of a server computer on which the first script was executed; and
   responsive to determining that the software build is for a test build, communicate a request for a stub value of the private secret key.

14. The computer-implemented method of claim 10, wherein the first script is further configured to:
   determine that the software build is for a production build based on a server environment variable of a server computer on which the first script was executed; and
   responsive to determining that the software build is for a test build, communicate the request for the value of the private secret key.

15. The computer-implemented method of claim 10, wherein the private secret key is used by a code module included in the executable file to digitally sign a payload for an application programming interface (API) request directed to an API server.

16. The computer-implemented method of claim 10, wherein communicating a request for the value of a private secret key over a private network from the first server computer to a keychain service executing on a second server computer is accomplished by the first script executing a command to execute a Python client script for the keychain service, wherein the first script is a shell script.

17. The computer-implemented method of claim 10, wherein the second script is a Python script and the automated software build tool is a version of the Buck automated software build tool.

18. The computer-implemented method of claim 10, wherein the source code files includes source code expressed in the Objective-C programming language, and the software compiler is a version of Clang.

19. A system to secure a private secret key during a software build, the system comprising:
   a first server computer executing a first script, the first script configured to perform operations comprising:
      communicating a request for a value of a private secret key over a private network from the first server computer to a keychain service executing on a second server computer, the request including a reference to a variable storing the value of the private secret key and an end-user identifier;

responsive to communicating the request, receiving from the keychain service the value for the private secret key; and invoking a second script for execution by an automated software build tool at the first server computer while passing from the first script to the second script the value for the private secret key, wherein the second script is configured to build an executable file for distribution with a software development kit, by:

invoking a software compiler to compile source code included in one or more source code files into the executable file, wherein at least one source code file contains a macro, which, upon executing at compile time, obtains the value of the private secret key from the automated software build tool for use by the executable file.

20. The system of claim 19, wherein the keychain service executing on the second server computer, upon receiving the request, utilizes an access control list to determine an end-user, who is associated with the end-user identifier received with the request, is authorized to access the value of the private secret key.

\* \* \* \* \*